(12) United States Patent
Kaksonen (10) Patent No.: US 7,797,590 B2
(45) Date of Patent: Sep. 14, 2010

(54) CONSENSUS TESTING OF ELECTRONIC SYSTEM

(75) Inventor: Rauli Kaksonen, Oulu (FI)

(73) Assignee: Codenomicon Oy, Oulu (FI)

( * ) Notice: Subject to any disclaimer, the term of this patent is extended or adjusted under 35 U.S.C. 154(b) by 987 days.

(21) Appl. No.: 11/589,484

(22) Filed: Oct. 30, 2006

(65) Prior Publication Data

US 2007/0118644 A1    May 24, 2007

(51) Int. Cl.
G06F 11/00 (2006.01)
G06F 7/02 (2006.01)
G01R 31/28 (2006.01)

(52) U.S. Cl. .................. 714/703; 714/742; 714/819

(58) Field of Classification Search .............. 714/703, 714/742, 724, 735, 736, 819, 732, 797, 799, 714/37, 46, 48, 39; 702/108, 117, 118, 121, 702/122, 109, 65, 75

See application file for complete search history.

(56) References Cited

U.S. PATENT DOCUMENTS

| 6,260,065 B1 | 7/2001 | Leiba et al. | |
|---|---|---|---|
| 6,373,822 B1 | 4/2002 | Raj et al. | |
| 2005/0278596 A1* | 12/2005 | Miyajima et al. | ........... 714/736 |

OTHER PUBLICATIONS

Telecommunications and Internet Protocol Harmonization Over Networks (TIPHON) Release 4; Interoperability test methods and approaches; ETSI TS 102 23701, ETSI Standards, European Telecommunications Institute, Sophia-Antipo, FR, vol. TIPHON-6, No. V411, Dec. 2003, XP014016252 ISSN: 0000-0001.

Sommerville, Software Engineering, Pearson Education Limited (2004), 7th Edition, p. 539, ISBN 0321210263.

Blackburn et al., Why Model-Based Test Automation is Different and What You Should Know to Get Started, Software Productivity Consortium (2004), pp. 1-16.

Helovuo et al., "Exploration Testing", Second International Conference on Application of Concurrency to System Design (2001), pp. 1-10.

Dierks et al., "The TLS Protocol Version 1.0", Network Working Group Request for Comments 2246, The Internet Society (1999), pp. 1-5.

Kaksonen, "A Functional Method for Assessing . . . ", Technical Research Centre of Finland, VTT Publications 448, Espoo (2001), pp. 55-57, ISBN 951-38-5874-X (on-line edition).

Dubuisson, "ASN.1 Communication Between Heterogeneous Systems", Academic Press (2001), pp. xviii-xx, ISBN 0-12-633361-0.

ETSI ES 201 873-1 V2.2.1, Methods for Testing and Specification (MTS); The Testing . . . version 3; Part 1: TTCN-3 Core Language, European Telec. Stand Instit. (2003), p. 12.

Extensible Markup Language (XML), W3C, www.w3.org/XML/.

* cited by examiner

Primary Examiner—Phung M Chung
(74) Attorney, Agent, or Firm—Ober/Kaler; Royal W. Craig (57) ABSTRACT

Consensus testing of electronic system. A tester (112) for testing an electronic system (100) includes: a traffic interface (114) to receive traffic (102) from a test of an electronic system (100); an element comparator (118) to extract a value from an element of the traffic (102) and to compare the extracted element value with an element value (110) obtained from another test of another electronic system (104, 106, 108); and a test result generator (122) to generate consensus information (124) on the interoperability of the electronic system (100), based on comparing (120) the extracted element values of the electronic system (100) with the element values obtained from the other test of the other electronic system (104, 106, 108).

22 Claims, 4 Drawing Sheets

CONSENSUS TESTING OF ELECTRONIC SYSTEM

CROSS-REFERENCE TO RELATED APPLICATIONS

The present application derives priority from European Application No EP05110181.4, filed 31 Oct. 2005.

BACKGROUND OF THE INVENTION

1. Field of the Invention

The invention relates to a tester for testing an electronic system, an arrangement for testing an electronic system, a computer program product for testing an electronic system, and a method for testing an electronic system.

2. Description of the Background

The goal of protocol conformance testing is to ensure that different products, often from different vendors, are interoperable. That is, they speak the same language and can work together. Conformance testing is described in Ian Sommerville: Software Engineering (7th Edition), 2004, ISBN 0321210263. Conformance testing usually has the following steps (Sommerville, page 539):

1. Design and create test cases: A test case is made up of input and expected output, which cover the intended behavior of the tested product.

2. Run the tests and note the differences in the expected behavior and the tested product. The problem with this approach is the difficulty of coming up with correct expected outputs. It is especially hard when specifications are incomplete. The number of test cases tends to be quite low because of the effort required to design the expected outputs. Interoperability tests, where different products are run against each other, are still required since not all relevant input and output patterns are recognized in the test case design.

Model-based testing is another way to create conformance tests. Model-based testing is described in M. Blackburn, R. Busser, A. Nauman: Why Model-Based Test Automation is Different and What You Should Know to Get Started, 2004, Software Productivity Consortium. Model-based testing usually has the following steps:

1. Create a model of the tested system.

2. Run automation that creates a set of test cases from the model.

3. Run the tests and note the differences in the expected behavior and the tested product.

The expected outcome for each test case is determined by executing the model. The problem is that the effort of creating the model can be compared to creating the actual conformance test cases. Still, this method can be used to create a larger number of test cases. The accuracy and relevance of test cases depends solely on the model, which adds a level of indirection since test cases are not created directly.

Sometimes, test case creation and test run are done at the same time, so that test cases are generated and run simultaneously. The number of test cases is not pre-defined, since the responses from the tested implementation affect the upcoming test cases. This is called exploration testing, and it is described in J. Helovuo, S. Leppänen: Exploration Testing, Second International Conference on Application of Concurrency to System Design, 2001. In automated regression testing, outputs gathered when running an earlier version are used as expected outputs to a newer version (Sommerville, page 564). The purpose of regression testing is to see that the changes introduced to the newer version have not introduced any extra changes to the new version. In back-to-back testing, two implementations of the same protocol are tested by identical inputs to ensure that their behavior is identical. However, both regression testing and back-to-back testing are limited to situations where results of two implementations are compared to pinpoint differences between them.

SUMMARY OF THE INVENTION

It is therefore an object of the present invention to provide an improved tester for testing an electronic system, an improved arrangement for testing an electronic system, an improved computer program product for testing an electronic system, and an improved method for testing an electronic system.

According to an aspect of the invention, there is provided a tester for testing an electronic system, comprising: a traffic interface to receive traffic from a test of an electronic system; an element comparator to extract a value from an element of the traffic and to compare the extracted element value with an element value obtained from another test of another electronic system; and a test result generator to generate consensus information on the interoperability of the electronic system, based on comparing the extracted element values of the electronic system with the element values obtained from the other test of the other electronic system.

According to another aspect of the invention, there is provided an arrangement for testing an electronic system, comprising: means for receiving traffic from a test of an electronic system; means for extracting a value from an element of the traffic and to compare the extracted element value with an element value obtained from another test of another electronic system; and means for generating consensus information on the interoperability of the electronic system, based on comparing the extracted element values of the electronic system with the element values obtained from the other test of the other electronic system.

According to another aspect of the invention, there is provided a computer program product embodied on a distribution medium for testing an electronic system, comprising: a traffic interface module to receive traffic from a test of an electronic system; an element comparator module to extract a value from an element of the traffic and to compare the extracted element value with an element value obtained from another test of another electronic system; and a test result generator module to generate consensus information on the interoperability of the electronic system, based on comparing the extracted element values of the electronic system with the element values obtained from the other test of the other electronic system.

According to another aspect of the invention, there is provided a method for testing an electronic system, comprising: receiving traffic from a test of an electronic system; extracting a value from an element of the traffic and comparing the extracted element value with an element value obtained from another test of another electronic system; and generating consensus information on the interoperability of the electronic system, based on comparing the extracted element values of the electronic system with the element values obtained from the other test of the other electronic system.

The invention provides several advantages. The expected output is not defined beforehand, but it is collected from the observed behavior. The number of test cases may be high, since creation of the test cases for the preliminary test is relatively cheap. Also, any repeatable set of test cases may be used as the basis of consensus testing. A higher number of test cases may provide a higher coverage than a lower number.

Consensus testing does not require the tester to have a model of the electronic system. The different electronic systems in effect form the model. Creation of the consensus test material can be conducted by a tester with reasonable knowledge of the application domain of the electronic system without expert mathematical or modelling skills.

By using a consensus testing material a tester can compare the behavior of his/her implementation with other implementations without having direct access to these implementations. This may decrease the need of interoperability events where live systems brought together are compared with each other.

The selection of the elements to be compared, consensus voting and verdict assignment may be done separately from the design and/or execution of preliminary test cases, even off-line by using only the recorded traffic. No tested implementation needs to be available at this point.

BRIEF DESCRIPTION OF THE DRAWING

Other objects, features, and advantages of the present invention will become more apparent from the following detailed description of the preferred embodiments and certain modifications thereof when taken together with the accompanying drawing in which.

DETAILED DESCRIPTION OF THE PREFERRED EMBODIMENTS

Figure 1:
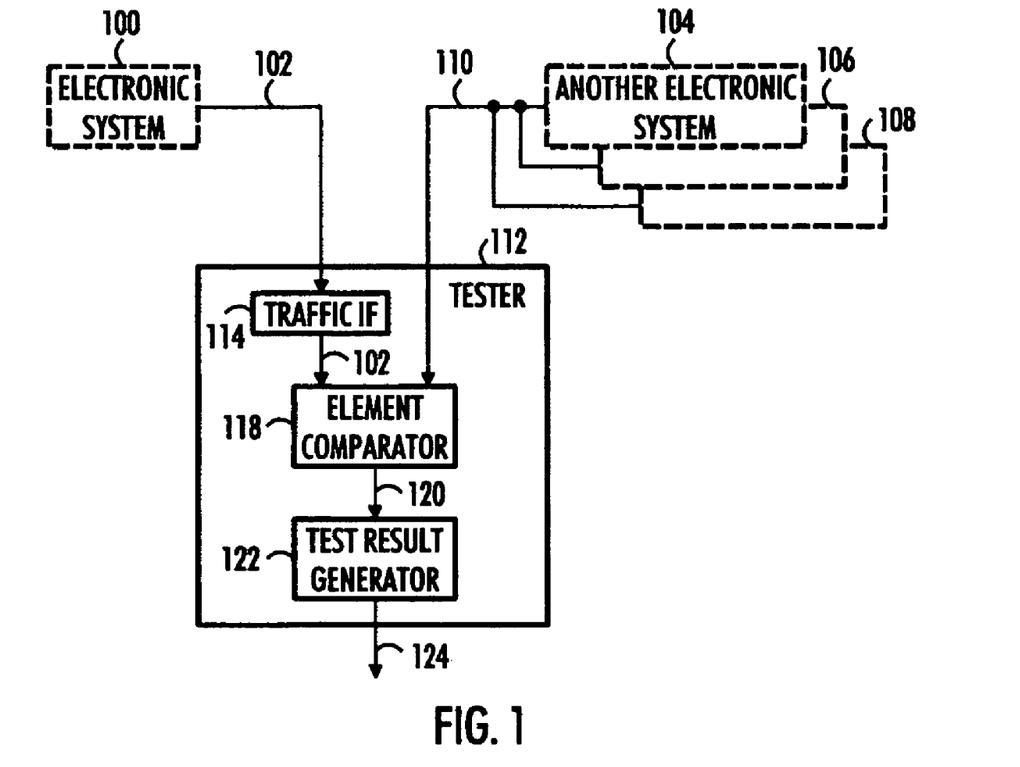
FIG. 1 illustrates a tester for testing an electronic system.

With reference to FIG. 1, let us examine an overall view of a tester 112 for testing an electronic system 100. The tester 112 implements a novel principle of consensus testing. With the consensus testing protocol conformance, protocol interoperability and other testing goals may be achieved through black-box testing. The consensus testing technique may create test material for a protocol by comparing the behavior of different electronic systems, such as different implementations of a protocol. The implementation may be a hardware device, a software program, a simulation, an emulator, an executable model, etc., or a system made of such parts.

Consensus testing may be suitable for assessing protocols where the protocol implementation does not have a large number of alternative strategies to respond to a set of input. One example of such a protocol is TLS (Transmission Layer Security) handshake, where a TLS peer has to respond to messages from another peer in a strict way. TLS is described in RFC 2246, The TLS Protocol, Version 1.0. Many other security and authentication and other protocols have similar handshake functions. Also request-reply-like protocols may be well suited for consensus testing: if requests are identical, replies should be identical or almost identical.

The tester 112 includes a traffic interface 114 to receive traffic 102 from a test of an electronic system 100. The test for the electronic system 100 may be performed in real time, or the traffic 102 may have been recorded earlier from a test of the electronic system 100.

The tester 112 also includes an element comparator 118 to extract a value from an element of the traffic 102 and to compare the extracted element value with an element value 110 obtained from another test of another electronic system 104, 106, 108. The other test for the other electronic system 104, 106, 108 may have been performed earlier with the tester 112. The other test may also be performed later, as the traffic 102 from the test of the electronic system 100 may be saved and processed only after the other test has been performed. The other test for the other electronic system 104, 106, 108 may also be performed with another tester, and the relevant information from the other test may be imported to the tester 112 testing the electronic system 100 by any known data transfer means, such as data communication means or transferable data storage means. These embodiments will be described in more detail later. Note that there may exist more than one other electronic system 104, 106, 108, with which the traffic 102 from the electronic system 100 will be compared. Instead of different implementations, a single implementation may be used with different configuration settings. Instead of different implementations, multiple versions of a single implementation may also be used.

The tester 112 also includes a test result generator 122 to generate consensus information 124 on the interoperability of the electronic system 100, based on comparing 120 the extracted element values of the electronic system 100 with the element values obtained from the other test of the other electronic system 104, 106, 108.

Figure 4:
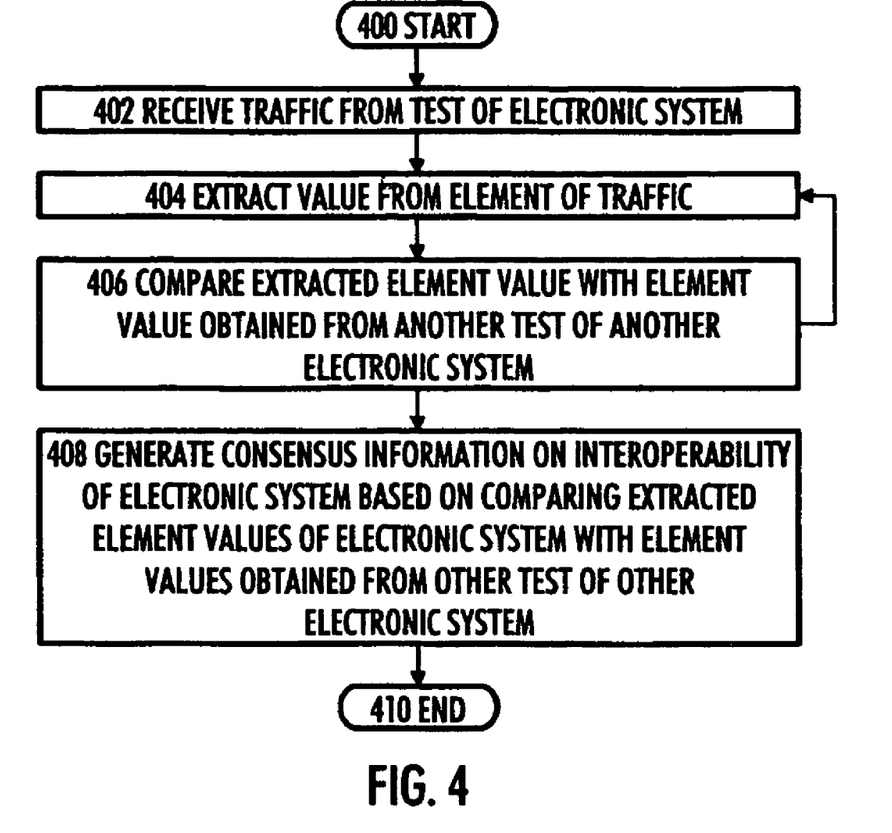
FIG. 4 is a flow chart illustrating a method for testing an electronic system.

With reference to FIG. 4, let us examine a method for testing an electronic system. The method starts in 400.

In 402, traffic from a test of an electronic system is received. After that, a value from an element of the traffic is extracted in 404 and the extracted element value is compared in 406 with an element value obtained from another test of another electronic system. As shown in FIG. 4, operations 404, 406 may be repeated until all elements are processed.

Finally, in 408, consensus information on the interoperability of the electronic system is generated based on comparing the extracted element values of the electronic system with the element values obtained from the other test of the other electronic system. The method ends in 410. Embodiments of the tester 112 may be applied to the method as well.

The method may additionally include one or more operations, or some part of the seven operations that will be explained next.

1. Create Test Case Inputs.

A set of test cases is created. It may be that only the input for each test case has to be defined. The expected outcome for each test case does not need to be defined. This makes the creation of a test case easy and makes it possible to have a larger number of test cases compared to the traditional conformance testing.

2. Run Preliminary Test Runs.

The test cases may be run against different implementations of the protocol in question. Different versions of the same implementation or single implementation configured differently may also be used. The data sent or received for each test case is recorded. Sometimes only a portion of the traffic may be stored, for example just the output from the tested implementation or a portion of the output.

3. Aggregate Test Run Information.

The results from different preliminary test runs may be collected into a single repository. The repository may contain minimally the recorded traffic for each test case.

4. Decide the Elements to be Compared.

The compared elements used in the consensus calculations may be decided based on the recorded data and other available information, if any. Alternatively, the compared elements may have been decided already before the preliminary test runs. This enables only the compared elements to be recorded.

The compared elements are the basis of the consensus testing. Different compared element values from different implementations may indicate a meaningful difference in the behavior between the tested implementations; accordingly, the same compared element values may indicate a similarity between the implementations. The element to be compared should remain constant for a test case from one test run to another against the same tested implementation. However, when comparing different implementations, the compared element may show variation if the implementations have some differences in their behavior.

For example, a time stamp may not be a good candidate since time is constantly changing unless the clock can be set to a fixed value for testing. A random value element is another example of an element that may not be suited for a compared element. Examples of potential compared elements are message type identifiers, status codes or error codes. The presence or absence of a specific field in a received message may also be a good compared element. Sometimes only a type of a data field may be used as the compared element. The comparison may also take place on message level without looking into the actual contents of the messages.

All test cases may use the same compared data elements, or the test cases may have different compared data elements.

The compared elements may be decided manually by applying knowledge of the protocol and by observing the recorded test material. Automation may be used to pick out the elements that have shown a suitable level of variation. The final set of data elements may be finally decided by using user judgment on the results from the automation.

Alternatively, the selection of compared elements is either left totally to an automated system, or an automation system provides suggestions for the user or consults the user on some issues. The automation analysis may be based on the frequency of different elements in the recorded traffic, for example.

5. Make a Consensus Vote.

A vote for the consensus value for each test case may be cast. A vote may be given to each compared element value recorded from different implementations. The compared element value used by most of the implementations gets most of the votes.

If there are multiple compared elements for a test case, then the value is the aggregate from all of the compared elements.

The consensus strength for each test case may be given based on the number of values getting votes:

Strong consensus: Compared element values from all implementations are identical or there is a single dominant compared element value. The only or dominant value is called a consensus value.

Weak consensus: There are a few dominant compared element values for the test case.

No consensus: There are many compared element values with equal or similar number of votes.

Test cases with strong consensus indicate where the interoperability of the tested products has already been achieved for most of the implementations. Weak consensus indicates areas where further work is required by product developers. No consensus indicates that the specification in this area is unclear or flawed. Weak or no consensus may also mean that compared elements are not properly defined or the part of the protocol cannot be tested reliably using consensus testing.

At this stage, a user may review the test cases with strong consensus to see if there are cases not making real sense. A strong consensus test case may reflect a situation where it would be legal for the implementation to behave differently, and the tested ones just happened to behave identically. In that case, the user may choose to either remove this test case or declare that there is no consensus in this test case.

6. Give Test Verdicts for Implementations.

The test case verdicts for each implementation may be given by using the information about compared elements and the consensus strengths. A test case may be given the following verdicts:

Passed: The test case has strong consensus and the value of the implementation for the compared element or elements matches the consensus value.

Failed: The test case has strong consensus, but the value of the implementation for the compared element or elements does not match the consensus value.

Inconclusive: The test case has weak consensus or no consensus. The test case does not bring information about interoperability of the implementation.

Alternatively, the results may include the number of votes received by the compared element value used by the implementation. The higher the value, the higher the confidence in the implementation to be interoperable.

Sometimes different compared elements may be used to cast several different votes, which results in multiple verdicts per test case. In such a case a final test case verdict may be given such that the test case is passed only if all sub-verdicts are passed, and the test case is inconclusive if any of the sub-verdicts is inconclusive. Otherwise the compiled verdict of the test case is failed.

Operations 4, 5 and 6 may be repeated several times to create a set of compared elements best meeting the testing goals.

7. Packaging.

When desired, the test results may be packaged to form a consensus testing material. The testing material enables the later use of consensus testing without repeating all operations.

A test material may contain the following information:

The input for the test case.

Instructions to extract the compared elements from traffic.

For each test case:

Consensus strength.

The consensus value, if strong consensus.

Compared element values, which were voted for, and the number of votes per value.

The test material may contain all of the test cases used in the preliminary test run or only a subset of them (only test cases with strong consensus, for example).

Next, a simplified consensus testing process is walked through.

The test material is created for HTTP (HyperText Transfer Protocol) server testing. The results do not reflect results from real servers but are crafted to serve as good sample material. The examplary test material is brief; the number of test cases may be much higher in reality.

Each test case input is an HTTP GET request; test case #0 is perfectly valid and should fetch the index page of the server. The next four test cases #1, #2, #3 and #4 contain different version values, which may or may not be valid.

1. Create Test Case Inputs.

The preliminary test cases are shown in Table 1.

TABLE 1

Preliminary test case inputs

| Test case | Input |
|---|---|
| #0 | GET/HTTP/1.0\n\r |
| #1 | GET/HTTP/1.00\n\r |
| #2 | GET/HTTP/1.01\n\r |
| #3 | GET/HTTP/01.0\n\r |
| #4 | GET/HTTP/11.0\n\r |

2. Run Preliminary Test Runs.

For compactness, only the first HTTP status line returned from the server is retained as the test output. The HTTP header lines and a possible Web page are not stored.

3. Aggregate Test Run Information.

Tables 2, 3, 4 and 5 show the results of four different HTTP servers (A, B, C and D).

TABLE 2

Test results of server A

| Test case | Result |
|---|---|
| #0 | HTTP/1.1 200 OK |
| #1 | HTTP/1.1 400 bad-request |
| #2 | HTTP/1.1 400 bad-request |
| #3 | HTTP/1.1 200 OK |
| #4 | HTTP/1.1 200 OK |

TABLE 3

Test results of server B

| Test case | Result |
|---|---|
| #0 | HTTP/1.1 200 OK |
| #1 | HTTP/1.1 400 Bad request |
| #2 | HTTP/1.1 400 Bad request |
| #3 | HTTP/1.1 200 OK |
| #4 | HTTP/1.1 200 OK |

TABLE 4

Test results of server C

| Test case | Result |
|---|---|
| #0 | HTTP/1.1 200 OK |
| #1 | HTTP/1.1 400 bad-request |
| #2 | HTTP/1.1 200 OK |
| #3 | HTTP/1.1 400 bad-request |
| #4 | HTTP/1.1 400 bad-request |

TABLE 5

Test results of server D

| Test case | Result |
|---|---|
| #0 | HTTP/1.1 200 OK |
| #1 | HTTP/1.1 400 Bad request |
| #2 | HTTP/1.1 400 Bad request |
| #3 | HTTP/1.1 200 OK |
| #4 | HTTP/1.1 400 bad-request |

4. Decide the Elements to be Compared.

It is concluded from the test results that the proper element to be compared is a three-digit status code, which is the value after the fixed part "HTTP/1.1". The status code expresses the status of the request in a compact form.

5. Make a Consensus Vote.

The results indicate that test cases #0, #1, #2 and #3 give strong consensus, although in test cases #2 and #3 the vote is not unanimous. The limit used to declare strong consensus may be such that 75% percent or more of the votes must be cast to the same value. Table 6 compares test results.

TABLE 6

Comparison of test results

| Test case | Server A | Server B | Server C | Server D | Votes for "200" | Votes for "400" | Consensus Strength |
|---|---|---|---|---|---|---|---|
| #0 | 200 | 200 | 200 | 200 | 4 | 0 | Strong |
| #1 | 400 | 400 | 400 | 400 | 0 | 4 | Strong |
| #2 | 400 | 400 | 200 | 400 | 1 | 3 | Strong |
| #3 | 200 | 200 | 400 | 200 | 3 | 1 | Strong |
| #4 | 200 | 200 | 400 | 400 | 2 | 2 | No consensus |

In reality, it may be preferable to use additional implementations in preliminary tests to get more reliable consensus strength values for the test cases.

Consensus testing may provide quantitative information about the behavior of the tested electronic system in the form of consensus level. The consensus level indicates how many votes the element value obtained from the test of the electronic system received in the consensus test material. In Table 6, the consensus level of test case #2 for server B is 3, i.e. the number of votes received by value "400" (=value received from server B with test case #2), for example. Correspondingly, the consensus level of test case #2 for server C is only 1. The consensus level is a numerical value ready for further processing. For example a vendor of a product may follow the consensus level of their product as new releases of the products are tested, but also when new consensus test material becomes available. The new material contains information about the behavior of new versions of other implementations of the system.

6. Give Test Verdicts for Implementations.

The test cases #0, #1, #2 and #3 can be used to declare pass or fail, but test case #4 is inconclusive for all. Table 7 summarizes the results. On overall, A, B and D passed all the test cases which had consensus, while C failed test cases #2 and #3.

TABLE 7

Verdicts for test cases

| Test case | Server A | Server B | Server C | Server D |
|---|---|---|---|---|
| #0 | Pass | Pass | Pass | Pass |
| #1 | Pass | Pass | Pass | Pass |
| #2 | Pass | Pass | Fail | Pass |
| #3 | Pass | Pass | Fail | Pass |
| #4 | Inco | Inco | Inco | Inco |

7. Packaging.

Finally, the material may be packaged for testing of HTTP servers. The package may contain the following parts:

The input for the test cases #0, #1, #2, and #3 (#4 is omitted since there was no consensus).

Compared element information: The status code.

For each test case #0, #1, #2 and #3: the consensus strength, the consensus value, and the compared element values, which were voted for, and the number of votes per value.

Table 8 shows the packaged data.

TABLE 8

Packaged data

| Test case | Votes for "200" | Votes for "400" | Consensus value | Strength | Input |
|---|---|---|---|---|---|
| #0 | 4 | 0 | 200 | Strong | GET/HTTP/1.0\n\r |
| #1 | 0 | 4 | 400 | Strong | GET/HTTP/1.00\n\r |
| #2 | 1 | 3 | 400 | Strong | GET/HTTP/1.01\n\r |
| #3 | 3 | 1 | 200 | Strong | GET/HTTP/01.0\n\r |

Note that test case #4 could be retained for other testing purposes than consensus testing.

Figure 2:
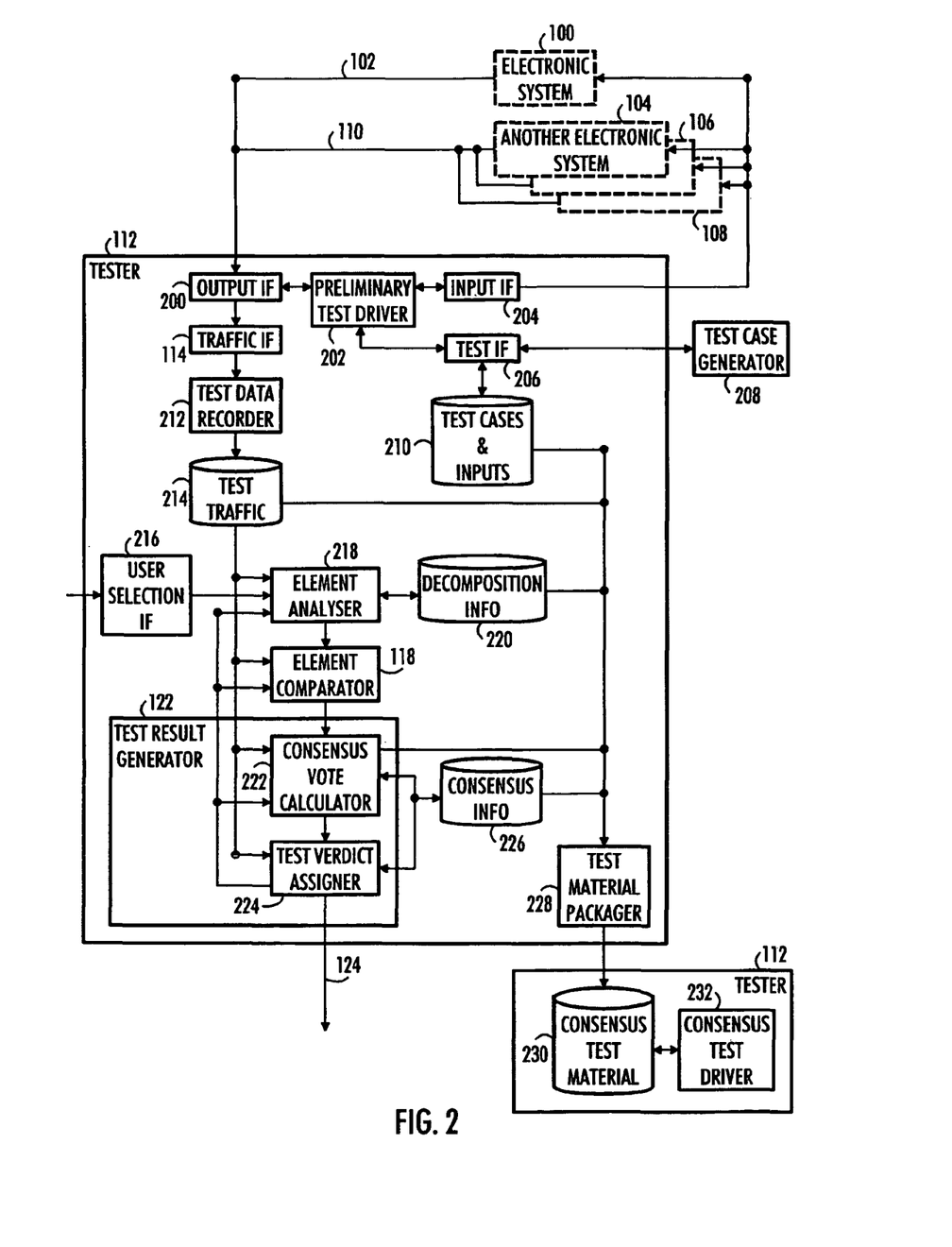
FIG. 2 illustrates embodiments of the tester.

Next, embodiments of the tester 112 will be explained with reference to FIG. 2. The tester 112 may include some additional components: a test case generator 208, a preliminary test driver 202, a test data recorder 212, an element analyser 218, a consensus vote calculator 222, a test verdict assigner 224, a test material packager 228, and a consensus test driver 232.

All of the components may be individual entities or some of them may be integrated to form larger entities. Ultimately they all may form the tester 112. Parts from other independent systems may also act in roles of the tester 112 components.

The test case generator 208 generates the preliminary test cases. The test case generator 208 may be integrated in the tester 112 or it may be a separate system for generating test cases. A separate test case generator 208 is not necessarily required if the preliminary test driver 202 generates the test cases. The preliminary test cases may be created by hand (manually), using some test automation system, by an executable model, by a software program, by a hardware device, through simulation, by an emulator, etc. or a system made up from them. Traffic recorded for other purposes or test material created for another purpose than consensus testing may also act as the preliminary test results. The tester 112 may include a test interface 206 to receive predetermined test cases and their inputs. The tester 112 may also include storage 210 to save the test cases and their inputs.

The preliminary test driver 202 may run the preliminary test cases. The test driver is able to run identical sets of test cases for all tested implementations, so that the comparison is based on valid data. Basically, any system capable of interacting with the tested implementations may act as the preliminary test driver 202. The preliminary test driver 202 may be testing software, an interpreter, an executable model, a software program, a hardware device, simulation, an emulator, etc. or a system made up from them. The tester 112 may include an input interface 204 to feed an input of a test case into the electronic system 100, 104, 106, 108 and an output interface 200 to receive an output of the test case from the electronic system 100, 104, 106, 108.

The test data recorder 212 may save the traffic from the tested system in test traffic storage 214. It may store full traffic or just a portion of the traffic data, e.g. just responses or a portion of the responses. The data may be divided into test cases for later processing. The nature of this division may be dependent on the type of the protocol used in testing and the data available from the test driver: if the test driver divides the traffic into test cases, then they may be used directly; if the protocol is made up of independent sessions, etc., then one session may be a test case; or if the protocol is made up of request-reply pairs, then one pair may be a test case. Naturally, any other logical test case composition may also be used.

The amount of collected data may be limited by collecting only the elements which are identified beforehand as the compared elements, are candidates to be the compared elements, can be stored to the available space, or are simply available. Naturally, the elements may also be chosen for some other suitable reason.

The element analyser 218 may determine which elements are the compared elements. The element analyser 218 may decompose the traffic into elements. The element analyser 218 may also select a portion of the elements for the element comparator 118. The element analyser 218 may perform the selection automatically. Such an automatic selection may be based on the number of different elements in the traffic, the number of different element values in the traffic, the frequency of different elements in the traffic, the frequency of different element values in the traffic, the importance or other weight value set for an element, and/or the location of an element in a message, for example. Suitable elements include a message type, a field type, a status code, an error code, an enumerated field with predefined values, a version field, an identifier field, any text string, any primitive field (e.g. an integer field or a character field), an XML element, an XML attribute, ASN. 1 Basic Encoding Rule type and value elements, ASN. 1 Packet Encoding Rule prefix and value elements, a canonical or trimmed value of an element (e.g. white space removed), presence or absence of a message, presence or absence of an optional field in a message, and element selected from a set of optional elements. The tester 112 may include an interface 216 to receive a selection of an element from a user of the tester 112. The tester 112 may also include storage 220 to save decomposition information on the decomposition of the traffic into the elements.

The element analyser 218 may be able to break down the traffic data into elements to choose the compared elements. The possible methods for this decomposition may be, for example:

Mini-Simulation Method, described in R. Kaksonen: A Functional Method for Assessing Protocol Implementation Security, Espoo, Technical Research Centre of Finland, VTT Publications 447. ISBN 951-38-5873-1 (soft back edition), ISBN 951-38-5874-X (on-line edition).

ASN.1 with any of its encoding rules, described in Oliver Dubuisson: ASN.1 Communication Between Heterogeneous Systems, ISBN 0-12-633361-0.

TTCN ASPs (Abstract Service Primitives), TTCN PDUs (Protocol Data Units) or TTCN message templates, described in ETSI ES 201 873-1 V2.2.1 (2003-02), Methods for Testing and Specification (MTS); The Testing and Test Control Notation version 3; Part 1: TTCN-3 Core Language.

XML element structures, described in Extensible Markup Language (XML), W3C, www.w3.org/XML/.

Or any other suitable method for structural decomposition of protocol

The element analyser 218 may contain automation, which fully or with user interaction determines the most suitable compared elements.

The element analyser 218 may accept feedback from the element comparator 118, the consensus vote calculator 222 and/or the test verdict assigner 224, in order to determine which set of compared elements produces the most useful compared elements and consensus testing material.

Instead of choosing compared output elements from a set of all elements, the element analyser 218 may decide to use all output from the tested electronic system as the compared elements by default. An "ignore set" may define which elements are ignored in the comparison. Compared elements are all traffic elements excluding the ignore set. An initial ignore set may be automatically collected, e.g. by running the same test case multiple times against the same implementation and including all changing elements in the ignore set. The initial ignore set may thus be expanded step-by-step.

The element comparator 118 may take the recorded traffic, divided into test cases, and lists the compared element values per test case and per tested implementation.

The element comparator 118 may need to be able to extract the compared elements from the traffic, as the element analyser 218 did.

Comparing of compared element values may not always be based on exact values, but other equality criteria may also be used. White space may be ignored or leading zeroes may be removed from an integer value, for example.

The consensus vote calculator 222 may calculate the votes per test case and determines the strength of the consensus. A vote may be given for each value an element has, so that the compared element value used by most of the electronic systems gets most of the votes. A consensus strength value may be given to a test case based on the vote distribution for an element of the test case. As was explained earlier, the consensus vote calculator 222 may give a strong consensus value to the consensus strength if there is a single dominant compared element value, a weak consensus value to the consensus strength if there are a few dominant compared element values, and a no consensus value to the consensus strength if there are many compared element values. A single dominant compared element value means that all the compared element values from all electronic systems are identical or that there is clearly, according to a predetermined limit, a single dominating value. For the choice between the weak consensus value and no consensus values there may be another predetermined limit, i.e. a limit defining the difference between "a few" and "many".

The tester 112 may include storage 226 to save for each test case the consensus strength value, the compared element values which were voted for, the number of votes per the compared element value, and as a consensus value the single dominant compared element value if the consensus strength has the strong consensus value.

The test verdict assigner 224 assigns a verdict for each of the test cases for each tested implementation, based on the consensus votes, strength of consensus and the element values from the implementations, i.e. based on information about the compared elements and the consensus strength values. As was explained earlier, the test verdict assigner 224 may give a passed value to the test verdict if the test case has the strong consensus value for the consensus strength and the element value is the same as the single dominant compared element value, a failed value to the test verdict if the test case has the strong consensus value for the consensus strength but the element value of the electronic system is not the same as the single dominant compared element value, and an inconclusive value to the test verdict if the test case has the weak consensus value or no consensus value to the consensus strength. Alternatively, or additionally, the test verdict assigner 224 may give as the result the number of votes received by the compared element value that the electronic system has. The test verdict assigner 224 may evaluate an aggregate test case including more than one vote so that it gives a passed value if all sub-verdicts are passed, an inconclusive value if any of the sub-verdicts is inconclusive, and a failed value otherwise.

The test material packager 228 may be used to pack the consensus testing information for future use. The material may be used both to test the implementations used in the preliminary testing or to test new implementations. The test material may be a stand-alone entity or a data file or files readable by a separate test driver, for example.

The preliminary testing results may be anonymised, so results of an individual preliminary test run cannot be assigned to a specific implementation tested.

The consensus test driver 232 may be used to test an implementation using the packaged consensus test material 230. The consensus test driver 232 may be a hardware device, a software program or a combination of both. The consensus test driver 232 may be integrated with the testing information or it may read it from a data medium.

Figure 3:
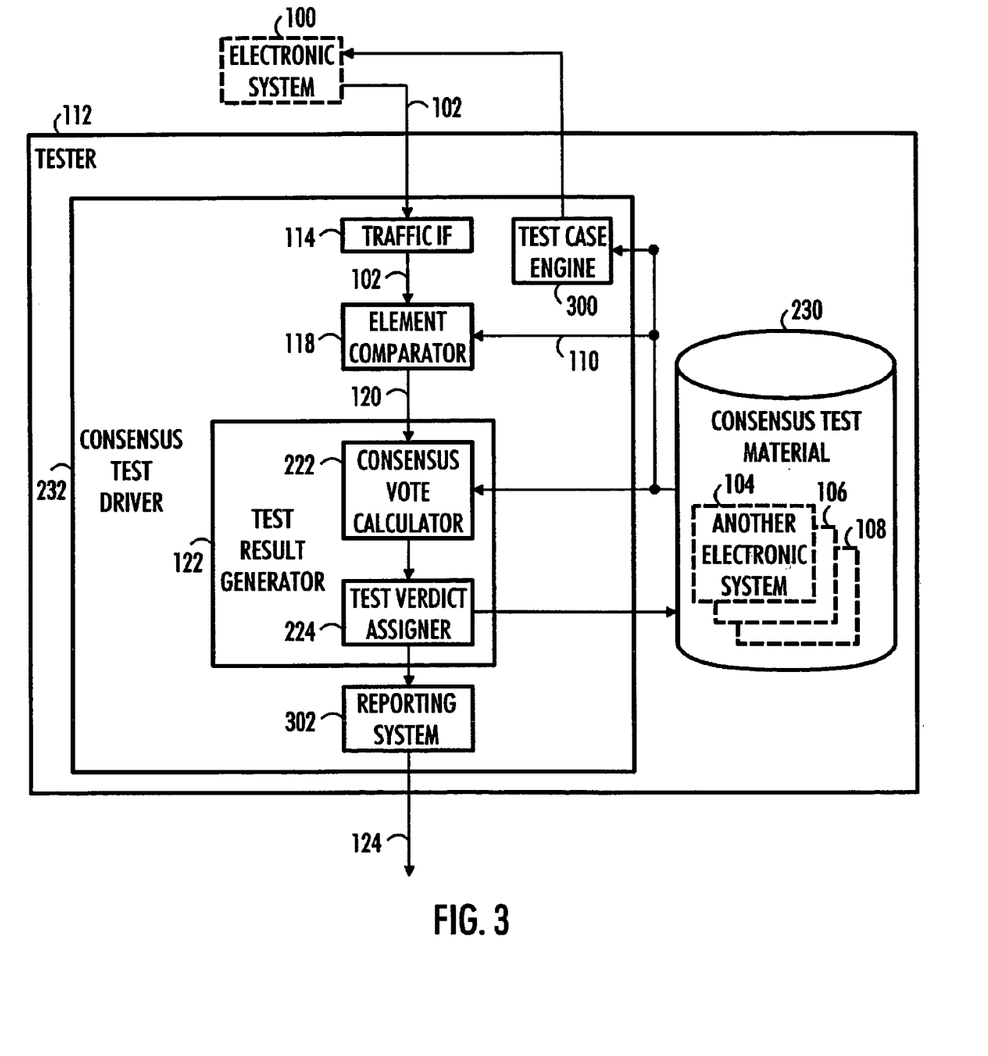
FIG. 3 illustrates further embodiments of the tester.

As shown in FIG. 3, the consensus test driver 232, together with the consensus test material 230, may form a stand-alone tester 112 for testing an electronic system 100, with the data obtained from the earlier tests of the other electronic systems 104, 106, 108.

The consensus test driver 232 may implement some of the following functions:
Feeding the input to the tested implementation with a test case engine 300.
Receiving the replies from the tested implementation.
Extracting the compared elements from the traffic and resolving if they match the consensus value or other compared element values stored.
Reporting if there was a match to a consensus value or to other compared element values.
Selecting only a subset of test cases for execution.
Tuning the test run depending on the tested implementation, e.g. to provide address, port number, user names, user password, etc.
Integration interfaces to other testing systems and testing frameworks.

The consensus test driver 232 may adjust the fed input depending on the protocol. For example, a time stamp may be given a proper up-to-date value. Also, there may be a need to take into account some values from the responses received earlier, such as sequence numbers or session identifiers.

The consensus test driver 232 or a separate reporting system 302 may compile the result of a consensus test run to a test run report. This report may summarize the number of failed, passed or inconclusive test cases. The report may contain the consensus levels of the test cases and the total consensus level as the average of the values from the test cases. Several other metrics than ones mentioned here may be derived from the results. The report may be created during the test run or after the test run.

The use of the tester 112 may be distributed. A separate remote team or multiple teams may use the tester 112 to run the preliminary tests. Such distributed testing may be performed sequentially as follows: preliminary test cases and/or a preliminary test driver is sent to the remote teams, remote teams run the preliminary tests with their implementations, results may be anonymised, the recorded traffic is received in a centralized location, the consensus calculations are made, and consensus testing material may be packaged and the package may be sent to the remote teams in order to get verdicts for the tested implementations.

The tester 112 may also utilize parallel processing as follows: the preliminary test cases are executed in parallel against different implementations and the consensus strength and consensus vote calculations are done for each test case during the test case execution. The results may be shown to the tester once they are available.

One embodiment of the tester 112 is a computer program product for testing an electronic system. The tester 112 may be a standard computer running the computer program product for testing the electronic system. The described functionality/structures may be implemented as software modules. The computer program product may be embodied on a distribution medium.

The distribution medium may be any means for distributing software to customers, such as a (computer readable) program storage medium, or a (computer readable) memory.

In principle, the tester 112 may be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the tester 1 12, necessary processing capacity, production costs, and production volumes, for example.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A tester for testing an electronic system, comprising:
   a traffic interface to receive traffic from a test of an electronic system;
   an element comparator to extract a value from an element of the traffic and to compare the extracted element value with an element value obtained from another test of another electronic system; and
   a test result generator to generate consensus information on an interoperability of the electronic system, based on comparing the extracted element values of the electronic system with the element values obtained from the other test of the other electronic system.

2. The tester of claim 1, further comprising a test interface to receive predetermined test cases and their inputs.

3. The tester of claim 2, further comprising storage to save the test cases and their inputs.

4. The tester of claim 2, further comprising an input interface to feed an input of a test case into the electronic system, and an output interface to receive an output of the test case from the electronic system.

5. The tester of claim 1, further comprising an element analyser to decompose the traffic into elements.

6. The tester of claim 5, wherein the element analyser further selects a portion of the elements for the element comparator.

7. The tester of claim 6, wherein the element analyser performs the selection automatically.

8. The tester of claim 7, wherein the automatic selection by the element analyser is based on the number of different elements in the traffic, the number of different element values in the traffic, the frequency of different elements in the traffic, the frequency of different element values in the traffic, the importance or other weight value set for an element, and/or the location of an element in a message.

9. The tester of claim 5, wherein the tester further comprises an interface to receive a selection of an element from a user of the tester.

10. The tester of claim 5, further comprising a storage to save decomposition information on the decomposition of the traffic into the elements.

11. The tester of claim 1, wherein the test result generator further comprises a consensus vote calculator to give a vote to each value an element has, so that the compared element value used by most of the electronic systems gets most of the votes.

12. The tester of claim 11, wherein the consensus vote calculator further gives a consensus strength to a test case, based on the vote distribution for an element of the test case.

13. The tester of claim 12, wherein the consensus vote calculator further gives a strong consensus value to the consensus strength if there is a single dominant compared element value, a weak consensus value to the consensus strength if there are a few dominant compared element values, and a no consensus value to the consensus strength if there are many compared element values.

14. The tester of claim 13, further comprising storage to save for each test case the consensus strength value, the compared element values which were voted for, the number of votes per compared element value, and as a consensus value the single dominant compared element value if the consensus strength has the strong consensus value.

15. The tester of claim 13, wherein the test result generator further comprises a test verdict assigner to give a test verdict to the test case regarding the electronic system, based on information about the compared elements and the consensus strength values.

16. The tester of claim 15, wherein the test verdict assigner further gives a passed value to the test verdict if the test case has the strong consensus value for the consensus strength and the element value is the same as the single dominant compared element value, a failed value to the test verdict if the test case has the strong consensus value for the consensus strength but the element value of the electronic system is not the same as the single dominant compared element value, and an inconclusive value to the test verdict if the test case has the weak consensus value or no consensus value for the consensus strength.

17. The tester of claim 15, wherein the test verdict assigner gives as the result the number of votes received by the compared element value that the electronic system has.

18. The tester of claim 15, wherein the test verdict assigner evaluates an aggregate test case including more than one vote so that it gives a passed value if all sub-verdicts are passed, an inconclusive value if any of the sub-verdicts is inconclusive, and a failed value otherwise.

19. The tester of claim 1, wherein the tester tests an electronic system including software implementing formatted data input and output, 20. An arrangement for testing an electronic system, comprising:
   means for receiving traffic from a test of an electronic system;
   means for extracting a value from an element of the traffic and to compare the extracted element value with an element value obtained from another test of another electronic system; and
   means for generating consensus information on an interoperability of the electronic system, based on comparing the extracted element values of the electronic system with the element values obtained from the other test of the other electronic system.

21. A computer program product embodied on a distribution storage medium for testing an electronic system, comprising:
   a traffic interface module to receive traffic from a test of an electronic system;
   an element comparator module to extract a value from an element of the traffic and to compare the extracted element value with an element value obtained from another test of another electronic system; and
   a test result generator module to generate consensus information on an interoperability of the electronic system, based on comparing the extracted element values of the electronic system with the element values obtained from the other test of the other electronic system.

22. A method for testing an electronic system, comprising:
   receiving traffic from a test of an electronic system;
   extracting a value from an element of the traffic and comparing the extracted element value with an element value obtained from another test of another electronic system; and
   generating consensus information on an interoperability of the electronic system, based on comparing the extracted element values of the electronic system with the element values obtained from the other test of the other electronic system.

* * * * *

UNITED STATES PATENT AND TRADEMARK OFFICE
CERTIFICATE OF CORRECTION

PATENT NO. : 7,797,590 B2 Page 1 of 1
APPLICATION NO. : 11/589484
DATED : September 14, 2010
INVENTOR(S) : Rauli Kaksonen It is certified that error appears in the above-identified patent and that said Letters Patent is hereby corrected as shown below:

On the Title page, Foreign Application Priority Data should be added as follows:

(30) Foreign Application Priority Data

October 31, 2005      (EP) .................................05110181.4

Signed and Sealed this

Fourteenth Day of December, 2010

David J. Kappos
*Director of the United States Patent and Trademark Office*